Patented Aug. 27, 1935

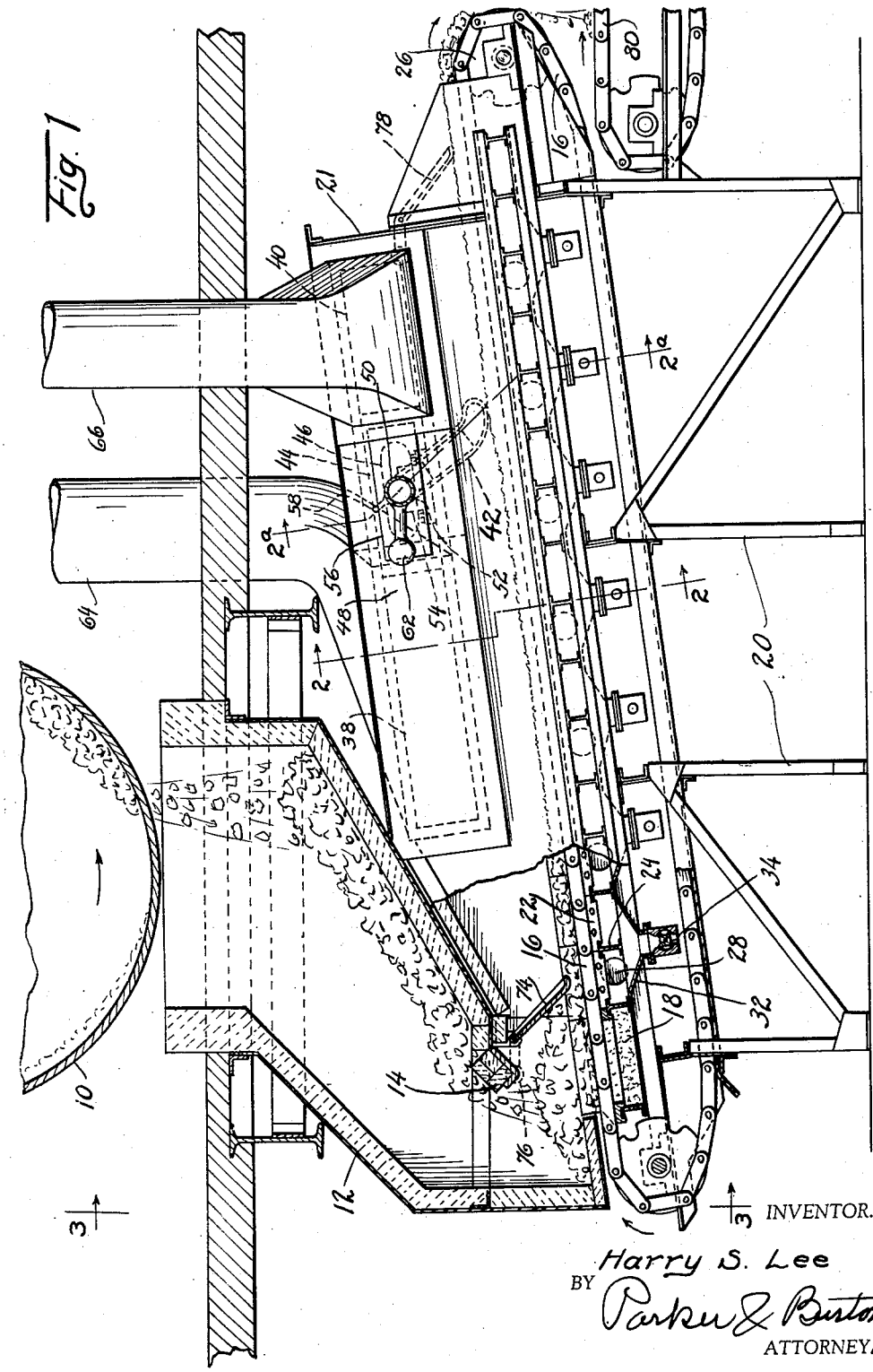

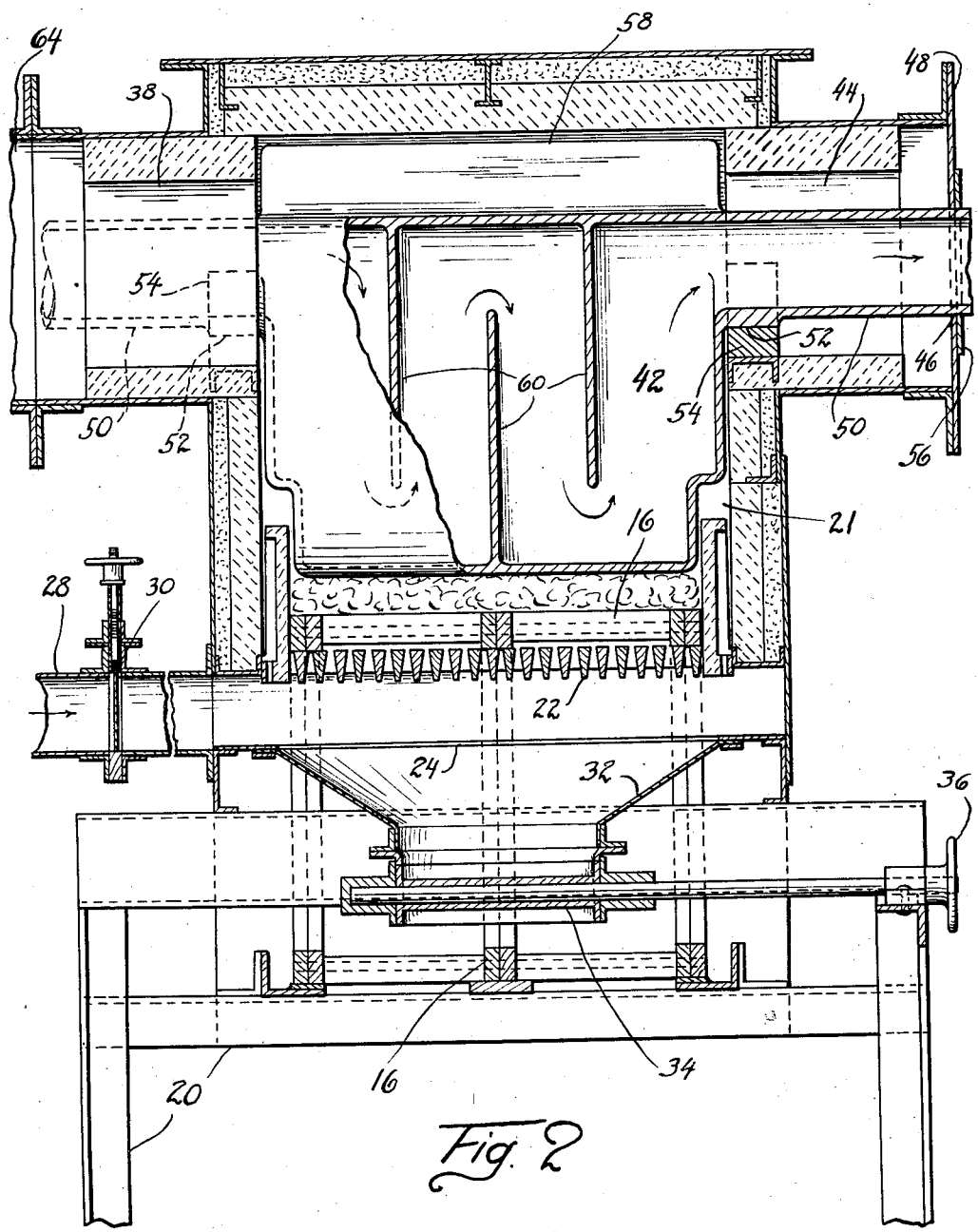

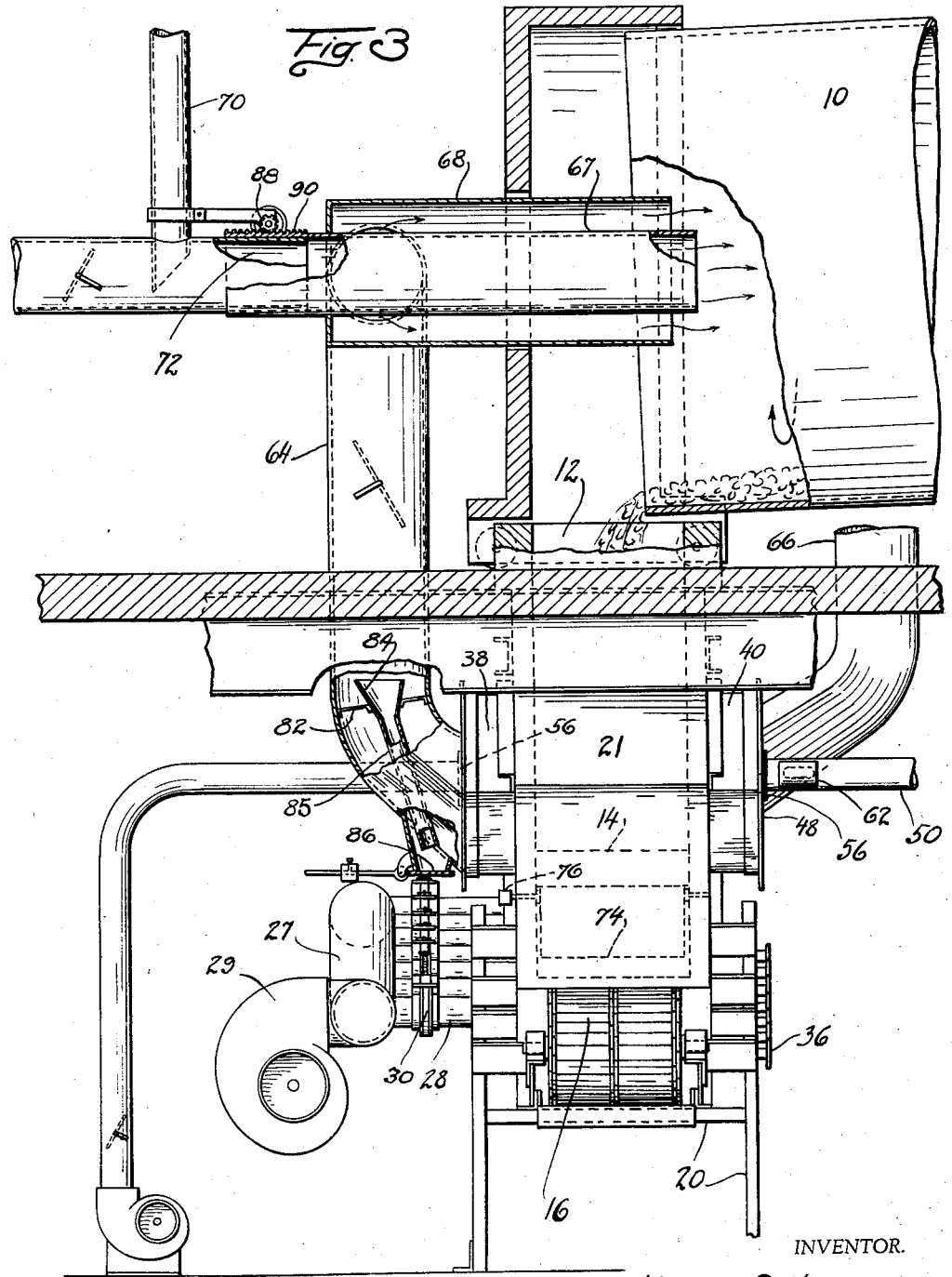

2,012,881

UNITED STATES PATENT OFFICE 2,012,881

APPARATUS FOR MANUFACTURING IMPROVED CEMENT CLINKERS

Harry S. Lee, Detroit, Mich.

Application June 10, 1931, Serial No. 543,416

12 Claims. (Cl. 263—32)

My invention relates to cement manufacture and has particular reference to a method of and apparatus for securing improved clinker for the manufacture of such cement.

An object of my invention is to secure a more completely burned clinker than that which ordinarily emerges from the burning kiln and to accomplish this without any substantial increase in the cost of manufacture.

A further object of my invention is to secure improved clinker which is of more uniform consistency than that produced by the ordinary kiln and which may be ground more readily to thereby produce a superior grade of cement. In accomplishing this above specified object I contemplate passing clinker which is ejected from any one of the conventional types of kilns through a clinker treatment chamber, which passage may be accomplished in any one of a number of ways, and passing an air draft upwardly through the clinker as it travels through the treatment chamber.

An important object of my invention is the provision of a clinker treatment chamber arranged to receive clinker from a kiln, which chamber is divided into two separate compartments isolated from each other as to air communication and isolated from the kiln as to uncontrolled air communication therewith. The first compartment receives the clinkers directly from the kiln and communicates therewith to deliver a controlled quantity of intensely heated air to the kiln. This compartment may be varied in size to control the quantity and temperature of the air delivered therefrom to the kiln and the quantity of air permitted to enter this compartment may be regulated as a function of the combustion requirements of the kiln to which the air is delivered in the quantity and at the temperature best suited to satisfy such combustion requirements.

Still another object of my invention is to economize substantially in the fuel necessary for the production of clinker by utilizing the hottest air, which is produced during the initial stages of the clinker's passage, to provide pre-heated oxygen to assist in the combustion of the fuel injected into the conventional kiln. This air enters in a highly heated blast surrounding the fuel feed pipe.

It will be apparent that any given type of cement kiln wherein a mixture of argillaceous and calcareous materials is burned to the point of incipient infusion will require a given amount of oxygen to insure combustion of the fuel utilized. It is therefore essential that air containing sufficient oxygen for this purpose be directed back to the fuel injector after its passage through the clinker bed. To that end I have provided a wall or valve separating the chamber into two compartments, which valve may be adjusted longitudinally of the chamber to increase or decrease at will the size of the first compartment to provide more or less oxygen as desired to be carried back to the kiln fuel injector. By this construction, I regulate the quantity of air which is directed back to the kiln, and control also the heat of such air so that air highly heated to the temperature desired, and in the desired amount, is delivered to the kiln.

A valve member is provided which rests upon the moving bed of clinker and prevents air from passing from the treatment chamber into the kiln through the clinker discharge chute. There is a momentary rise in temperature in the first compartment probably due to some exothermic changes in the crystalline structure of the clinker upon the passing of the air therethrough. While air is passed through both compartments to cool the clinker the quantity of air permitted to pass through the first compartment may be regulated solely as a function of the combustion requirements of the kiln and the quantity of air passed through the secondary compartment may be regulated solely as a function of the cooling requirements of the treatment chamber.

Yet another object of my invention is to associate with the improved mechanism means whereby the clinker, as it falls from the kiln, will form a bed of its own material from which the material subsequently deposited thereon may be drawn into the chamber. In this way the injurious effect of the highly abrasive clinker in wearing away the mechanism upon which it is dropped will be substantially reduced.

Various other objects and meritorious features of my invention will be apparent from the following description taken in conjunction with the drawings wherein like numerals refer to like parts throughout the several figures and wherein:

Fig. 1 illustrates my improved mechanism, somewhat diagrammatically,

Fig. 2 is a section taken along lines 2—2 and 2a—2a of Fig. 1, and

Fig. 3 is an elevation along 3—3 of Fig. 1.

Referring now to the drawings, numeral 10 illustrates a rotary type kiln adapted to rotate in the direction indicated by the arrow. This kiln is supported on a slight incline whereby the clinker, upon reaching the open end of the kiln illustrated in Fig. 1, is ejected into chute 12. This chute is provided with a removable spout 14 built up of fire brick over which the clinker drops through openings in a travelling chain stoker 16 into a pan element 18. As will be apparent from Fig. 1 the clinker first ejected into the pan 18 will form a bed upon which the clinker subsequently ejected from the kiln will drop.

Adjacent the chute 12, and supported upon any desirable type of frame 20, is my improved chamber 21, through which the clinker is drawn.

A grate 22 of any desired type extends along the length of the chamber, one end thereof being adjacent the pan shaped element 18 and the other end being at the opposite extremity of the closed chamber 21. This grate structure may be supported upon transverse beams 24 in the manner illustrated and the travelling chain stoker 16 is actuated by a power driven sprocket 26 located at one extremity of the assembly.

Air is admitted to the chamber through a plurality of spaced apart conduits 28, each of which is supplied from a manifold 27 associated with a blower 29 and may be controlled by any desired type of damper. In Fig. 2 a gate valve 30 has been indicated. Associated with each of these air inlets is a hopper 32 which is adapted to receive the clinker dust which may drop through the grate structure 22 as the clinker is pushed therealong by the travelling chain stoker 16. The base of each hopper is provided with some type of valve closure, a rotary valve 34 having been illustrated somewhat diagrammatically in the drawings. Each of the valves is controlled by some manually operable member such as the hand wheel 36. In this way the hoppers may be periodically emptied of the deposit and there will be no danger of clogging up the passage through which the air entering via conduits 28 travels.

One wall of chamber 21 is provided with a pair of spaced apart openings 38 and 40 through which the air which has passed through the clinker as it travels along the grate 22 is taken off. These openings may be on the same or opposite sides of the chamber, depending entirely on convenience of installation, or the heated air may be taken off from the top of the chamber. For illustrative purposes these openings are on opposite sides of the chamber. As hitherto stated it is desirable that the capacity of each of the compartments within the chamber be variable at will. For that reason I have provided an adjustable partition unit broadly indicated by the numeral 42 intermediate the two openings 38 and 40.

To permit longitudinal sliding movement of this partition element 42 without loss of the air within the chamber a box like chamber 44 having an elongated slot 46 in its outer wall 48 has been provided. There is a similar box like structure upon each side of the intermediate portion of the chamber, but for simplicity's sake only one of these has been illustrated in full in Fig. 2. Because of the extreme heat to which the partition element 42 is subjected it is desirable that the structure be air jacketed for cooling purposes. The element 42 is therefore provided with tubular arms 50 extending laterally upon each side, each tubular portion 50 being provided with a shoe portion 52 which is adapted to slide along a support block 54. A closure plate 56 is secured over the tubular portion 50 and lies flush against the outer wall 48 of the box like portion 44.

It will therefore be seen that the tubular portions 50 are free to slide longitudinally along the slot 46 while the closure lates 56 prevent the outward passage of hot air from within the interior of the chamber through slots 46. Air is directed through the partition element 42, which includes a plurality of baffle walls 60 for the purpose of circulating the air thoroughly within the partition. The lower extremity of the said partition 42 is adapted to rest upon the bed of clinker being passed thereunder and the upper portion is provided with a flange 58 which substantially prevents the passage of air over the partition. Cooling air is led in one side of the partition 42 through one of the tubular portions 50 and directed out the other side as clearly illustrated in Fig. 2. A counterweight 62 is secured to one or both of the tubular portions 50 to permit swinging movement of the partition 42 about tubular portions 50 as an axis. This is desirable because of the fact that oversized lumps of clinker may be travelling through the chamber on the grate and the partition must be free to permit its passage thereunder.

The openings 38 and 40 are connected with a pair of air conduits 64 and 66 respectively. It will be apparent that the clinker in that part of the chamber nearest the entrance point thereof will be the hottest and the air forced through the clinker bed in this portion of the chamber, which we shall term the front portion or first compartment, is consequently of a higher temperature than the air passed through the clinker at the rear portion of the chamber. This extremely hot air which is taken off the front portion of the chamber is led back to the fuel injector 67 by means of the air passage 64. Passage 64 may be provided with dampers as may be deemed advisable to control the amount and velocity of air passing therethrough. As illustrated in Fig. 3, the air is led from conduit 64 into a cylindrical tuyère 68 which surrounds the fuel injector 67. In the instance illustrated, powdered coal is the fuel utilized. The coal is delivered through passage 70 into an air passage 72 through which the air is forced to carry the powdered coal into the kiln 10. The hot air admitted to the kiln from the cylindrical tuyère 68 provides heated oxygen for combustion purposes.

At the base of the chute 12 is pivoted gate 74, which is provided with a counterweight 76, for the purpose of preventing hot air flow up through the chute 12 and also for the purpose of leveling out the clinker bed as it is drawn along the travelling chain stoker 16. A similar counterweighted seal gate 78 is provided at the rearward extremity of the chamber. Upon emerging from the chamber the travelling chain stoker 16 forces the clinker to drop on to a secondary conveyor 80 by which the cooled clinker may be carried elsewhere. The air escaping through the passage 66 at the rear portion of the chamber may be directed to waste heat boilers or any other suitable apparatus adapted to utilize heat of relatively low temperature.

Positioned within the passage 64 as by braces 82 is a somewhat funnel shaped collector 84. The air is deflected towards the walls of passage 64 as it passes collector 84, thereby creating a partial vacuum immediately above which permits any dust being carried through the passage to fall back into the container. The lower portion of member 84 continues in the form of a tube 85 which opens into a chamber offset from the passage 64 proper. This chamber is normally closed by a pivotally mounted counterweighted door 86, which opens automatically after receiving a predetermined weight of clinker dust.

It is desirable to provide means whereby the extent to which the fuel injector 67 projects beyond the open mouth of tuyère 68 may be adjusted. To this end the injector 67 is telescoped over air passage 72 and provided with a pinion 88 adapted to engage a rack 90 fixedly positioned in any suitable manner.

It will be apparent that I have provided a pair of compartments within a closed chamber, isolated from the kiln. One compartment delivers a controlled quantity of highly heated air to the kiln. The other compartment functions solely as a cooling compartment. The air emitted from the front compartment through the opening 38 passes through conduit 64 to the tuyère 68 surrounding the fuel injector 66 and furnishes preheated oxygen for securing combustion of the fuel.

This application constitutes a continuation in part of my earlier filed application, Serial No. 240,326, filed January 13, 1930, and all common subject-matter between the two cases is claimed generically herein.

What I claim:

1. In combination with a cement kiln, a chute adapted to receive clinker therefrom, a closed chamber having one end positioned adjacent the discharge end of said chute and including a shallow container adapted to receive clinker ejected from said chute, a grate extending from said container through said chamber, means for drawing clinker deposited in said container to a depth above the same across said grate, and means for directing an air draft through the bed of clinker so formed during its passage through the chamber.

2. In combination with a cement kiln, a chute adapted to receive clinker therefrom, a closed chamber having one end positioned adjacent the discharge end of said chute and including a shallow container adapted to receive clinker ejected from said chute, a grate extending from said container through said chamber, means for drawing clinker deposited in said container to a depth above the same across said grate.

3. In combination with a cement kiln, a chute adapted to receive clinker therefrom, a closed chamber having one end positioned adjacent the discharge end of said chute and including a shallow container adapted to receive clinker ejected from said chute, a grate extending from said container through said chamber, clinker advancing means extending across said grate and container for drawing clinker deposited in said container to a constant depth above the same across said grate.

4. In cement clinker cooling apparatus of the class described, the combination of a closed chamber, means for advancing heated cement clinker through said chamber from one end to the other, a partition element supported intermediate the ends of said chamber and adjustable longitudinally thereof, and means for directing a current of air through said partition member from a source outside the chamber.

5. In cement clinker cooling apparatus of the class described, the combination of a closed chamber, means for advancing heated cement clinker through said chamber from one end to the other, a hollow partition member supported for longitudinal movement along a limited portion of said chamber intermediate the ends thereof, the supporting means for said partition member including a pair of tubular conduits providing an air passage into and from said hollow partition.

6. Apparatus for the manufacture and treatment of cement clinkers comprising, in combination, a primary combustion chamber wherein cement clinkers are formed, a clinker treatment chamber arranged at one end to receive a continuous discharge of highly heated cement clinker from the combustion chamber, means for advancing said clinkers as a continuous stream through said treatment chamber from an intake at one end thereof to a discharge at the opposite end, means for directing an air draft through said advancing stream of clinkers within the treatment chamber, a flap valve pivotally supported within the treatment chamber to bear upon the moving stream of clinkers passing therethrough separating the air space within the treatment chamber from the primary combustion chamber to prevent flow of air from the treatment chamber into the primary combustion chamber through the clinker passageway, means separating the air space within the treatment chamber into two compartments, and means for taking the air away from said compartments separately.

7. Apparatus for the manufacture and treatment of cement clinkers comprising, in combination, a primary combustion chamber wherein cement clinkers are formed, a clinker treatment chamber arranged at one end to receive a continuous discharge of highly heated cement clinker from the combustion chamber, means for advancing said clinkers as a continuous stream through said treatment chamber from an intake at one end thereof to a discharge at the opposite end, means for directing an air draft through said advancing stream of clinkers within the treatment chamber, a valve gate pivotally supported within the treatment chamber to bear upon the stream of clinker moving therethrough separating the air space within the treatment chamber from the primary combustion chamber to prevent flow of air from the treatment chamber into the primary combustion chamber through the clinker passageway, a valve gate pivotally supported within the treatment chamber intermediate the ends of the chamber resting upon the stream of clinker passing therethrough separating the air space within the treatment chamber into two compartments, one compartment being adjacent to the clinker intake end of the treatment chamber and the other compartment being adjacent to the clinker discharge, means for varying the relative sizes of said compartments, and means for taking air from the compartment adjacent to the intake end and directing the same into the primary combustion chamber.

8. Apparatus for the manufacture and treatment of cement clinkers comprising a primary combustion chamber wherein cement clinker is formed, a clinker treatment chamber into which the primary combustion chamber discharges highly heated cement clinkers, means for advancing said cement clinkers in a continuous stream through said treatment chamber, means for directing an air draft through said advancing stream of cement clinkers within the treatment chamber, and valve means engaging the moving stream of clinkers preventing an uncontrolled quantity of air from passing into the primary combustion chamber from the clinker treatment chamber.

9. In combination with a cement kiln having a clinker discharge chute, a clinker treatment chamber communicating with the discharge end of the chute to receive clinkers therefrom, a grate extending lengthwise through said chamber, a drag chain adapted to advance clinker over said grate, a clinker support arranged underneath said drag chain at one end of the grate at a lower level than the grate and adapted to receive the clinker discharged from the chute into the chamber.

10. In apparatus for the manufacture and treatment of cement clinker, a closed cooling chamber adapted to receive said cement clinker and provided with mechanism to move the clinker in a bed through the chamber, swingably supported gate structures suspended at intervals within said chamber resting upon said clinker bed to act thereupon to level the same and dividing the chamber into separate compartments, at least one of said gate structures being adjustable lengthwise of the chamber, means for sealing the wall of said chamber about said adjustable gate structure, means for delivering air to said chamber to flow therethrough, and means for withdrawing air from said chamber by separate passageways communicating with separate compartments as determined by said gate structures.

11. Apparatus for the manufacture and treatment of cement clinkers comprising, in combination, a primary combustion chamber wherein cement clinkers are formed, a clinker treatment chamber arranged at one end to receive a continuous discharge of highly heated cement clinker from the combustion chamber, means for advancing said clinkers as a continuous stream through said treatment chamber from an intake at one end thereof to a discharge at the opposite end, means for directing an air draft through said advancing stream of clinkers within the treatment chamber, a valve gate pivotally supported within the treatment chamber to bear upon the stream of clinker moving therethrough separating the air space within the treatment chamber from the primary combustion chamber to prevent flow of air from the treatment chamber into the primary combustion chamber through the clinker passageway, a valve gate pivotally supported within the treatment chamber intermediate the ends of the chamber resting upon the stream of clinkers passing therethrough separating the air space within the treatment chamber into two compartments, one compartment being adjacent to the clinker intake end of the treatment chamber and the other compartment being adjacent to the clinker discharge end thereof, said gate being adjustable lengthwise within the treatment chamber, means for taking air heated by the clinker passing through the compartment adjacent to the intake end of the treatment chamber and delivering such air to the primary chamber, and means for controlling the temperature of such air by varying the position of said adjustable gate lengthwise within the treatment chamber.

12. Apparatus for the manufacture and treatment of cement clinkers comprising a primary combustion chamber wherein cement clinker is formed, a clinker treatment chamber into which the primary combustion chamber discharges highly heated cement clinkers, means for advancing said cement clinkers in a continuous stream through said treatment chamber, means for directing an air draft through said advancing stream of cement clinkers within the treatment chamber, and valve means engaging the moving stream of clinkers preventing an uncontrolled quantity of air from passing into the primary combustion chamber from the clinker treatment chamber, said valve being swingably supported to extend downwardly from its pivotal support and in the direction of movement of the clinker stream and adapted to bear thereupon and to rise or fall in response to the increase or decrease in thickness of the moving stream of clinker.

HARRY S. LEE.